United States Patent Office 3,144,315
Patented Aug. 11, 1964

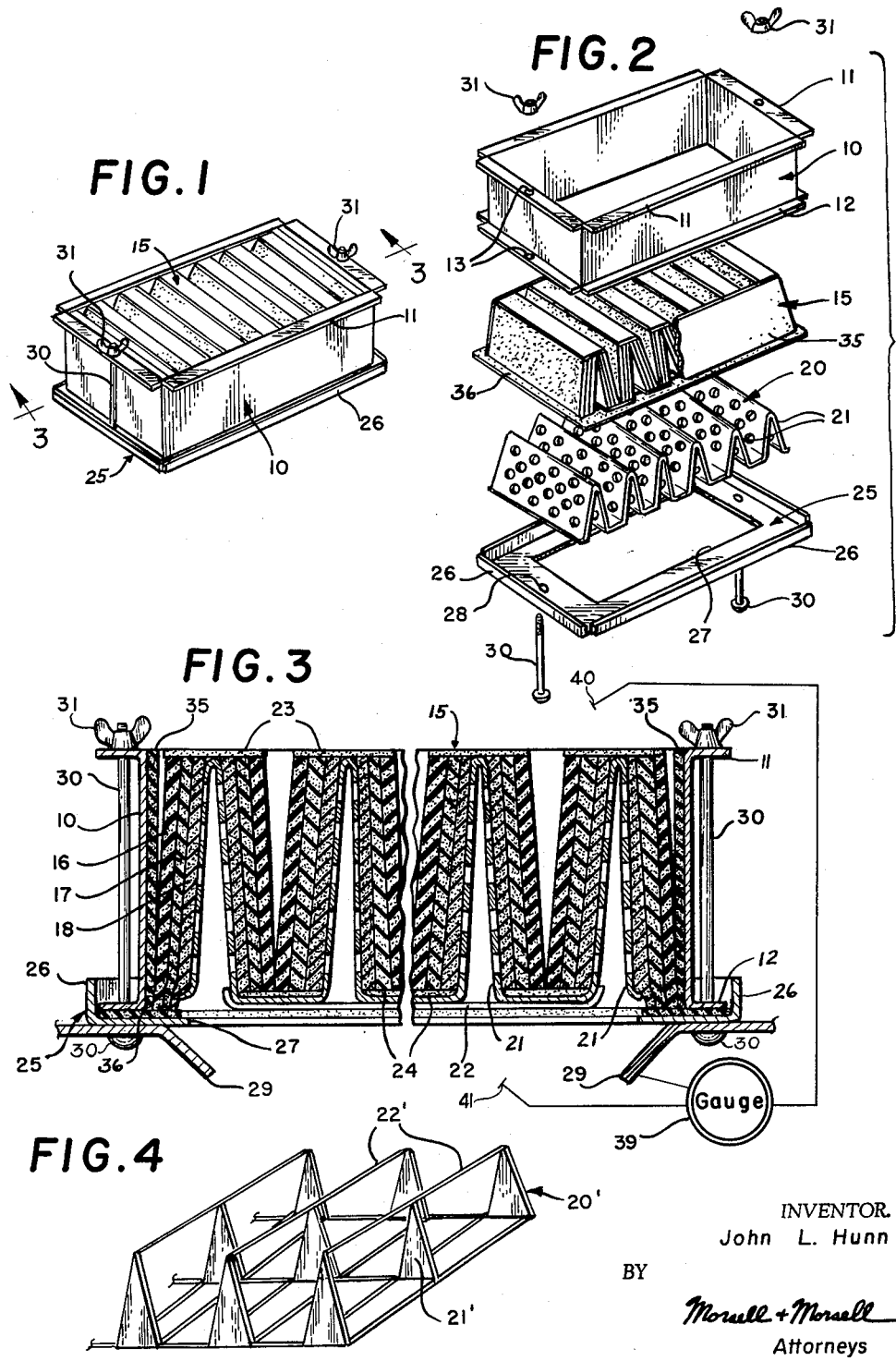

3,144,315
AIR FILTER FOR INTERNAL COMBUSTION ENGINES
John L. Hunn, 3838 N. Maryland Ave., Milwaukee, Wis.
Filed Aug. 17, 1962, Ser. No. 217,561
3 Claims. (Cl. 55—274)

This invention relates to an improved air filter for internal combustion engines, and more particularly to an improved filter unit especially well suited for use in airplanes.

The air filters presently in use in airplanes consist either of specially-treated paper, or of wire screening which has flocking applied thereto, and these filters are not entirely satisfactory for their intended purpose. For one thing, while such filters strain out the larger particles of dirt and the like, they do not always strain out the smaller particles such as silica granules, which are actually the most destructive to the engine. Secondly, such thin, single sheet filters are quickly clogged by the filtered dirt particles, with the result that an insufficient air supply is delivered to the carburetor. Moreover, when most of such conventional filters become ineffective it is impossible to replace the same without removing and replacing the entire filter assembly, which is not only tedious and time-consuming, but is expensive.

With the above considerations in mind, the principal objects of the present invention are to provide a novel air filter unit which is adapted to strain out even the finest dirt and silica particles, thus substantially increasing the useful life of the engine, and which improved unit is so designed that the filter element may be quickly and easily replaced therein when required without necessitating the removal and replacement of the entire assembly.

A more specific object of the present invention is to provide a novel air filter utilizing a synthetic foam material as the filter medium, in place of the common wire screening or paper devices heretofore used, and which foam material not only has superior filtering qualities, but wherein the thickness, or depth, of said foam material provides a multiplicity of filtering planes, thus minimizing the accumulation of dirt on the surface thereof and greatly prolonging the useful life of the filter.

A further object of the invention is to provide an improved filter unit as described which can be readily installed in existing airplanes to replace the inferior conventional filters thereon, and wherein it is unnecessary to make any expensive structural alterations in the regular filter mounting assembly.

A further object of the present invention is to provide an improved filter unit as described which is relatively simple and inexpensive in design and construction and which can be manufactured and sold for considerably less than the filters in present use.

Still another object of the present invention is to provide a novel filter unit for airplanes which includes a differential pressure gauge adapted to accurately indicate the operating efficiency of the filter medium at all times, thus eliminating the necessity for relying on a mere visual check of the filter to determine its condition, as is presently done and which is unreliable and dangerous.

With the above and other objects in view, the present invention comprises the improved air filter for internal combustion engines and all of its parts and combinations as set forth in the claims, and all equivalents and modifications thereof which come within the spirit of said invention.

In the accompanying drawing, wherein the same reference numerals designate the same parts in all of the views:

FIG. 1 is a perspective view of the assembled filter unit;

FIG. 2 is an exploded perspective of the complete filter assembly comprising the invention;

FIG. 3 is a longitudinal sectional view of the unit mounted in an air induction chamber; and FIG. 4 is a perspective view of a modified form of filter medium supporting frame.

Referring now more particularly to the drawing, the basic unit comprising the present invention includes an open rectangular frame member or casing 10, a filter element 15 which fits therein, a filter element-supporting frame 20, and a base member 25. In use, the entire unit is mounted on the air induction manifold 29 (FIG. 3) of an airplane, and is secured together and in place thereon by means of bolts 30, as will be hereinafter described in greater detail.

In the preferred form of the invention the outer shell or casing member 10 is formed of a durable but relatively inexpensive plastic or similar material, while the base 25 is preferably formed of a rigid, non-corrosive metal or alloy. In this regard, however, it is to be understood that the other materials would undoubtedly prove satisfactory, and the invention is not to be limited in this respect. As will be seen in the drawing, said rectangular casing 10 is provided with laterally-projecting top and bottom flanges 11 and 12, respectively, which extend completely therearound. With respect to the references herein to the "top" and "bottom" of the assembly, incidentally, these terms are used merely for convenience and to coincide with the pictorial illustration of the invention, and it is to be understood that the unit may be mounted in any position when in use, depending upon the design of the particular plane. Said casing 10 is of a size to fit within the base member 25 with the bottom flanges 12 thereon abutting an upstanding flange 26 around the perimeter of said base member. Aligned apertures 13 are formed in said casing flanges 11 and 12, at the ends of any other convenient location thereon, and it is through said apertures that the aforementioned retaining bolts 30 are projected when the unit is assembled, as will be described.

The illustrated filter element-supporting frame 20 is formed of a rigid metal or plastic material and is provided with a plurality of spaced, inverted V-shaped sections 21 having planar portions therebetween, as shown. The function of said frame is to support the pliable filter medium and to prevent the same from being deformed or displaced by the inrushing air during operation, or by the pressure differential created on the opposite sides of said filter. In addition, and as will be hereinafter explained in greater detail, the filter element in the present invention is in the form of elongated parallel projections or pleats, and said V-shaped frame sections 21 are designed to support and maintain said pleats in correct, spaced condition relative to each other. Ordinarily, said divider sections 21 are secured together to form a unitary frame, but they could also be separate from each other and the invention is not to be limited in this respect. The entire surface of said supporting frame 20 is perforated, to permit air to pass therethrough, and the bottom of said frame in the illustrated form of the invention has flanged longitudinal brace members 22 (FIG. 3) to lend rigidity thereto and to maintain the spacing between said divider sections. Said supporting frame is rectangular in plan view and is slightly smaller than the casing 10 within which it fits. The illustrated structure is but one of several possible brace or frame devices which could be employed, it being necessary merely that some rigid support means be provided for the filter medium, as described. In FIG. 4, for example, there is disclosed a modified form of support frame 20' comprising a plurality of aligned, spaced triangular members 21' having horizontal rods 22' extending therebetween, and upon which the filter medium can be supported. In short, it is essential that the unit comprising the present invention include means for rigidly supporting the pliable filter medium against collapse, but the particular design of said supporting structure is not critical so long as it performs its intended function and is separable from the other components of the unit.

The base 25 hereinabove mentioned is also rectangular in form and is slightly larger around its perimeter than the casing 10, said casing being designed to fit closely therein when the unit is assembled. Said base has a large, rectangular central opening 27 therethrough, and is provided with apertures 28 alignable with the casing flange apertures 13.

As best appears in FIG. 3, the filter medium 15 characterizing the present invention is composed of three layers of porous, foam-like material such as polyurethane which has been treated with a special oil, said layers being approximately ⅛" thick. The outer layer 16 is composed of relatively coarse foam having approximately 45 pores per square inch, the intermediate layer 17 is formed of finer foam, having 60 pores per inch, while the inner layer is formed of very fine foam having approximately 80 pores per square inch.

The function of said filter medium, of course, is to strain particles of dirt and the like from the air supply directed to the carburetor, and while the above pore ratio is not critical to the invention it has been found to provide unusually satisfactory results. It is to be understood, however, that other porous materials, and layer arrangements, might also be used without departing from the spirit of the invention.

In the formation of the filter element, strips of said polyurethane or similar material are cut to lengths equalling the width of the frame member 20, and three of said strips are superposed on one another, with a strip of fine foam forming the inner layer 18, medium foam forming the intermediate layer 17, and the coarser foam forming the outer layer 16. Three more strips are then laid thereon in the opposite order, the fine foam being on the inner side and the coarsest forming the outermost layer, as shown in FIG. 3. The six strips of foam material are then joined along their top longitudinal edges by a strip 23 of adhesive plastic or the like to form a section. An identical section is then formed with six more, similarly disposed strips and is positioned next to and parallel with said first section, and the lower adjacent longitudinal edges of said sections are joined by an adhesive strip 24. Still another section is then added in the same manner and this procedure is repeated until the necessary number of sections have been joined together to form a complete filter element, the number of sections included being dependent upon the size of the particular filter unit.

The inverted, V-shaped sections thus forming the filter element in the present invention provide a greatly increased exposed surface area, as compared to conventional flat, sheet-like filters, with the result that a maximum volume of air can pass through the relatively small, compact unit. This is especially important in airplanes, of course, where space and weight limitations are involved. As an alternative to the somewhat complex method of forming the filter element described, wherein individual strips of the filter medium are cut to size and then joined together in a plurality of adjacent sections, it might be preferred for some uses to merely overlie three long sheets of said material, and to then fold the same to obtain upstanding pleats which would serve the same general purpose as said upright sections. It has been found, however, that the illustrated arrangement is superior for use in airplanes.

When the several V-shaped filter sections have been joined together to form a complete filter element 15 as described, a strip 35 of fine filtering material is affixed to the sides and surrounding said filter element, and strips 36 are secured to the underside thereof around the bottom opening, the function of which strips is to eliminate leakage between said filter pack and the casing and base members when the unit is assembled.

To assemble the complete unit hereinabove described, the filter medium 15 is positioned over the top of the rigid supporting frame 20 and is forced downwardly thereover so that the upright sections 21 on said frame project upwardly between the two groups of three layers in each of said filter sections (FIG. 3). Said filter medium is then pulled downwardly so that it completely and snugly covers said supporting frame. The filter pack, or cartridge, formed by said assembled frame and filter medium is then positioned on the upper surface of the base member 25, and the casing 10 is lowered thereover until it bears against said filter medium bottom strips 36, the lower flanges 12 on said casing fitting closely within the upright flanges 26 of said base as described.

The retaining bolts 30 are then projected through the aligned apertures 28 and 13 in said base and casing members and through suitable apertures in the air intake manifold 29, there being conventional wing nuts 31 or the like threaded onto the upper ends of said bolts. By tightening said wing nuts the casing 10 is drawn tightly against the base 25, thus compressing the aforementioned strips 35 of filter material wedged between said casing and the filter element 15 and also compressing the strips 36 between the casing flanges 12 and the upper surface of the base members 25. The result is a sealing arrangement whereby air cannot leak through the unit without passing through the filter medium.

In addition to the above enumerated structural elements, wire screening may be positioned over both, or either, the top and bottom openings of the assembled unit to function as supplemental filtering means, but this is not ordinarily desirable.

In the use of the novel filter unit comprising the present invention on an airplane or the like, the incoming air is directed through the open top face of the casing 10 and is caused to pass through the angled wall portions of the multiple-layered filter medium 15, the pleat-like design of the filter element providing a maximum exposure area as described. Said filtered air then passes through the opening 27 in the base member and is directed through the air induction conduit to the carburetor. As hereinabove mentioned, the outer layer 16 of said filter medium has relatively large pores therethrough, with the result that the larger particles of dirt, silica, and the like are strained out thereby, while the intermediate layer 17 is less permeable and functions to filter out smaller particles, and the inner layer 18 is of a fine density and functions to filter out any remaining minute silica particles and the like. Due to the use of said relatively thick, triple-layered filtering element, the dirt particles do not all accumulate on one surface, as in conventional, single sheet filters, and the possibility of the filter medium quickly becoming clogged or packed with dirt is minimized.

In the preferred form of the invention, a differential pressure gauge 39 (FIG. 3) is mounted adjacent the rear face of the unit and is designed to indicate the pressure differential between the opposite sides of the filter during operation of the engine, such a gauge being easily connectible to the control panel in the airplane. In FIG. 3 there is illustrated, diagrammatically, a suitable pressure differential sensing apparatus including a first probe 40 positioned on the intake side and a second probe 41 on the discharge side of the filter, said probes being connected to the gauge 39, as shown. By this means, it is possible to determine accurately and scientifically when the efficiency of the filter has become so low that it is dangerous and should be replaced, and the necessity for relying on a mere visual observation of the filter is eliminated.

When it is indicated that the present filter has become clogged to the point where it does not operate effectively, the unit may be quickly disassembled merely by removing the retaining bolts 30, or whatever suitable clamping means are employed, and lifting the rectangular casing 10 away from the base. The filter medium 15 may then be removed from its supporting frame 20 and washed in oil or in soap and water to remove the dirt therefrom, or said relatively inexpensive filter element may be discarded and replaced with a new one if desired. The unit is quickly reassembled and installed merely by again placing the casing 10 over the new filter element and connecting the same to the base and manifold by means of the bolts 30, as described.

From the foregoing detailed description, it will be appreciated that the present invention provides a unique air filter assembly which is not only designed to function far more effectively than the devices presently in use, but which improved unit may be quickly and easily disassembled when it is desired to replace or clean the filter medium. In addition, the present unit is so designed that gauge means can be incorporated therein to give an accurate determination of the effectiveness of the filter at all times, thereby eliminating the common practice of changing the filter only when it appears dirty to an observer, which is completely unreliable and dangerous inasmuch as it is the minute, invisible particles which are the most injurious to an engine.

It is to be understood, of course, that modifications either in the design or materials employed in many of the structural elements illustrated and hereinabove described will undoubtedly occur to those skilled in the art upon reading the foregoing specification, and all of such changes or modifications are contemplated as may come within the spirit of the invention and within the scope of the following claims.

What I claim is:

1. In an air filter for internal combustion engines, the structure comprising: a rectangular base member having an opening therethrough and having a transverse flange around its perimeter; a rigid, permeable filter-supporting frame separably mounted on said base, said frame having a plurality of parallel, tapered projections extending laterally across said base; and forming elongated angled faces, said faces having a plurality of apertures therethrough; a permeable filter element removably mounted on said frame, said filter element including an inner layer of porous synthetic foam material on and covering said tapered frame projections, and a second layer of more permeable foam material superposed on said inner layer; a rectangular, open-ended casing separably mounted on said base and surrounding said filter element, said casing fitting closely within said base member flange; sealing means between adjacent portions of said interfitting filter element, casing, and base members; and means releasably securing said interfitting members together.

2. In an air filter for internal combustion engines, the structure comprising: a rectangular base member having an opening therethrough and having a transverse flange around its perimeter; a rigid, permeable filter-supporting frame separably mounted on said base, said frame having a plurality of parallel, tapered projections extending laterally across said base; and forming elongated angled faces, said faces having a plurality of apertures therethrough; a permeable filter element removably mounted on said frame, said filter element including an inner layer of porous synthetic foam material on and covering said tapered frame projections, an intermediate layer of more permeable foam material superposed on said inner layer, and said filter element including an outer layer of still more permeable foam material superposed upon said intermediate layer; a rectangular, open-ended casing separably mounted on said base and surrounding said filter element, said casing having a laterally-projecting flange closely fitted within said base member flange; sealing means between adjacent portions of said interfitting filter element, casing, and base members; and means releasably securing said interfitting members together.

3. The air filter recited in claim 2 and having a differential pressure gauge operatively associated therewith, said pressure gauge having first probe means extending therefrom to one side of said filter and second probe means extending therefrom to the opposite side of said filter, said probe means being operatively associated with a gauge adapted to indicate the pressure differential on opposite sides of said filter.

References Cited in the file of this patent

UNITED STATES PATENTS

| | | |
|---|---|---|
| 1,109,639 | Sutton | Sept. 1, 1914 |
| 2,080,154 | Strindberg | May 11, 1937 |
| 2,320,368 | Leathers | June 1, 1943 |
| 2,907,408 | Engle et al. | Oct. 6, 1959 |
| 2,964,127 | Korn | Dec. 13, 1960 |
| 2,999,562 | Lechtenberg | Sept. 12, 1962 |
| 3,026,967 | Stevens et al. | Mar. 27, 1962 |

FOREIGN PATENTS

| | | |
|---|---|---|
| 311,189 | Switzerland | Jan. 31, 1956 |